May 5, 1953
T. L. KENDALL ET AL
2,637,836
METHOD FOR CHARGING STORAGE BATTERIES
Filed Nov. 24, 1950
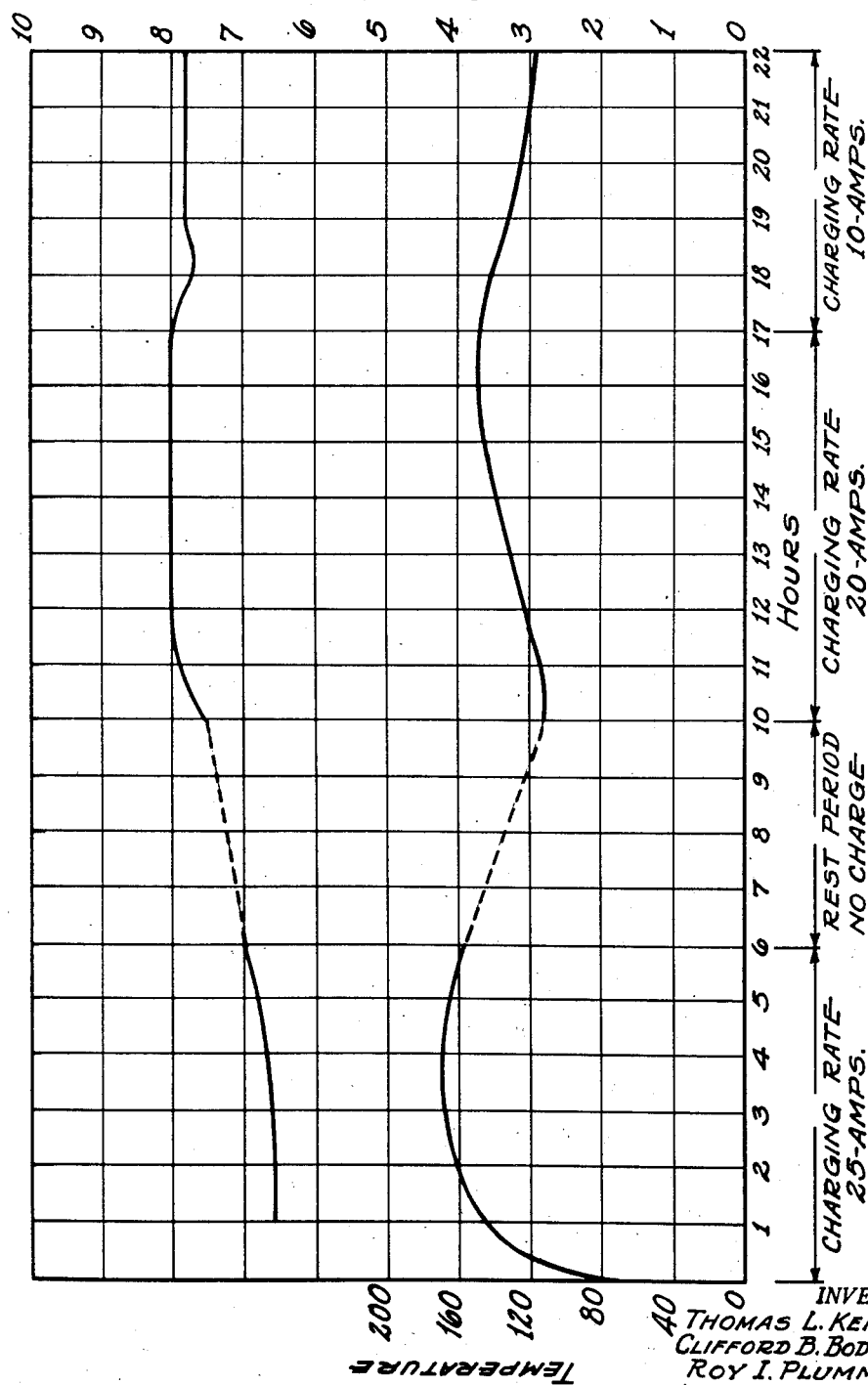
INVENTORS
THOMAS L. KENDALL
CLIFFORD B. BODENHAFER
ROY I. PLUMMER
their ATTORNEYS

UNITED STATES PATENT OFFICE 2,637,836

METHOD FOR CHARGING STORAGE BATTERIES

Thomas L. Kendall, Clifford B. Bodenhafer, and Roy I. Plummer, Muncie, Ind., assignors to General Motors Corporation, Detroit, Mich., a corporation of Delaware Application November 24, 1950, Serial No. 197,494

5 Claims. (Cl. 320—24)

This invention relates to storage batteries and is primarily concerned with processes for charging storage batteries.

It is a basic object of the invention to provide a new and improved charging pocess for Faure storage batteries wherein the period required to charge the battery is markedly reduced.

It is a further object of the present invention to provide a method for charging storage batteries wherein a high charge rate is utilized whereby the period of time required to fully charge the battery is greatly reduced.

In carrying out the above objects, it is still a further object to provide a method for charging storage batteries of the Faure type wherein the charging rate is maintained as high as possible compatible with gassing and temperature of the battery.

In carrying out the above object, it is a further object to limit the battery temperature to a maximum of 200° F. or below whereby gassing is controlled and wherein a fast charge is obtained.

A still further object of the invention is to provide a method for charging batteries wherein the battery is charged to between one-third to two-thirds and preferably one-half its full charge at as high a rate as possible without exceeding a maximum temperature of 200° F. The charge rate is then reduced sufficiently to permit cooling of the battery to within about 30° of the ambient temperature and simultaneously cause a precipitation of lead sulphate crystals on the positive and negative plates. The battery is then again charged at as high a rate as possible while maintaining the maximum temperature thereof at 150° F. or less until the battery is fully charged.

In carrying out the above object, it is a further object of the invention, in some cases, to reduce the charge rate to zero during the cooling off period.

Another object of the invention is to provide a charging method for storage batteries of the lead plate type wherein three periods are utilized. The first period provides a charge of from one-third to two-thirds and preferably one-half the full charge of the battery at as high a rate as possible while maintaining the temperature of the battery to between 100° and 120° F. about ambient temperature. The second period provides cooling the battery to from 20° to 40° above ambient temperature and the third period provides charging the battery at as high a rate as possible while maintaining the maximum temperature thereof to from 50° to 90° above ambient temperature until the battery is fully charged.

Another object of the invention is to provide a method for charging storage batteries wherein the charge rate is maintained as high as possible while controlling the maximum temperature of the battery, whereby excessive gassing is eliminated and the battery is charged in a shorter time period than was heretofore possible.

Further objects and advantages of the present invention will be apparent from the following description, reference being had to the accompanying drawing which shows graphically the charging procedure disclosed herein.

We have found that the charging rate input to a storage battery is controlled to a major degree by the gassing tendency of the battery. This gassing tendency is, in turn, controlled to a major degree by the temperature of the electrolyte. To this end we have discovered that batteries can be charged very rapidly if temperature control of the electrolyte is maintained whereby gassing is minimized and in this manner, a considerably higher charging rate may be used in connection with batteries charged under these controls.

We have further found that if a break is obtained during the charging period, lead sulphate crystals precipitate on the positive and negative plates and form nuclei for further growth of crystals, which action creates a more desirable plate and further permits continued high charge rates to be used due to the fact that the battery cools off during this break or rest period.

In essence, our invention is directed to charging a battery at as high a rate as possible compatible with the temperature thereof and attendand gassing to bring the charge within the battery to from one-third to two-thirds its full charge, after which the battery is rested during a period when no charge is induced therein or when a very reduced charge rate is being used. This rest period extends for a time sufficient to cause the battery to cool considerably, for example, during the first period the temperature of the battery should be maintained at 200° F. (for ambient temperatures of about 90° F.) or stated differently, from 100° to 120° maximum above the ambient temperature. During the rest period, the electrolyte should be permitted to cool to a temperature of from 20° to 40° above the ambient temperature whereupon charging is again resumed at a high rate of charge compatible with the temperature and with the gassing wherein the temperature of the electrolyte is controlled to a maximum temperature of from 50° to 90° above the ambient temperature until a full charge is obtained.

The temperature control figures are easily maintained through control of the current used in the charging process. The magnitude of the current, that is, the amperes per square inch of positive plate area is not important here providing the temperature restrictions are maintained and it will be found that very high charge rates may be utilized when the temperature of the battery is carefully controlled. For example, we have found that lowering of the ambient temperature permits the use of higher charge rates under otherwise similar conditions. This may be accomplished by fluid circulation, such as induced ventilation, by refrigeration, etc., and in each case as the ambient temperature goes down, the charge rate may be increased to a point where the maximum stated temperatures within the battery are obtained. Thus it is possible to fully charge a battery in very short periods of time, for example, from 16 to 22 hours, which short periods have hitherto been unheard of.

For illustrative purposes only, the following figures are given to show one charging pattern with a 15-plate battery of automotive type having approximately 350 square inches of positive plate area. The battery is initially charged with a 25 ampere input for six hours at which point it will be found that the temperature of the battery has reached a maximum of about 170° with a 70° ambient temperature. The battery is rested for about four hours whereupon the temperature thereof has dropped to about 114° F., then a 20 ampere charge is used for seven hours which increases the temperature of the battery to about 150° F. and finally a ten ampere charge is used for five hours which causes a reduction in temperature to 117° F. within the battery. In this example, sulphuric acid having a starting gravity of 1.175 to 1.225 is preferred although starting gravities of 1.050 to 1.300 may be used if the temperature of the electrolyte is properly controlled through control of the charge rate, ambient temperature and the like.

A chart showing counter E. M. F. and temperature conditions during each hour of the above charge is as follows:

| Hours | C. E. M. F. | Temp. | Charge rate, amp. |
|---|---|---|---|
| 0 | 0 | 70 | 25 |
| 1 | 6.6 | 148 | 25 |
| 2 | 6.6 | 160 | 25 |
| 3 | 6.6 | 167 | 25 |
| 4 | 6.7 | 169 | 25 |
| 5 | 6.85 | 164 | 25 |
| 6 | 7 | 158 | 25 |
| *4-hour rest* | | | |
| 10 | 7.5 | 114 | 20 |
| 11 | 7.9 | 116 | 20 |
| 12 | 8.0 | 122 | 20 |
| 13 | 8.0 | 130 | 20 |
| 14 | 8.0 | 138 | 20 |
| 15 | 8.0 | 142 | 20 |
| 16 | 8.0 | 148 | 20 |
| 17 | 8.0 | 149 | 20 |
| 18 | 7.6 | 138 | 10 |
| 19 | 7.8 | 129 | 10 |
| 20 | 7.8 | 125 | 10 |
| 21 | 7.8 | 120 | 10 |
| 22 | 7.8 | 117 | 10 |

Another specific example of fast charging of a storage battery with similar characteristics to these set forth above is; 25 to 35 ampere charge for four hours, a reduction in the charge to from 15 to 20 amperes for two hours, a reduction in charge to from two to six amperes during the rest period for about four hours, a 20 to 30 ampere charge for from six to seven hours and finally a ten to fifteen ampere charge for from four to five hours. It is apparent that throughout this charging procedure, the ambient temperatures must be relatively low if the higher end of the charge rate ranges are to be used and in all cases the temperature limitations set forth herein should be maintained.

It is similarly possible to charge a battery for five hours at 35 amperes, cool the battery either with or without a reduced charge being induced therein to a temperature of about 20 to 40° above the ambient temperature and then fast charge the battery under low ambient temperature conditions for ten hours at a 25 ampere charge wherein the control of temperature is maintained at all times to a maximum of 120° F. above ambient temperature during the first period, a maximum of about 40° F. above ambient temperature at the end of the rest period and a maximum of about 90° F. above ambient temperature during the final charging period.

The counter E. M. F. within the battery varies substantially inversely with the temperature while the temperature varies directly with the rate of charge and it is therefore necessary to balance these figures for best charging conditions. Since the temperature per se is the common factor, it is best to control this figure by raising or lowering the charge rate to maintain the optimum conditions wherein the specific maximum temperature stated here should be maintained. In all cases, the charging rate is dependent on the temperature which limits the gassing and therefore it is impossible to state the specific rate without knowledge of ambient temperature conditions, however, the examples set forth herein show the wide variation which may be practiced, in all cases controlling the maximum temperatures during the specific charge periods.

The rest period with or without a low charge is important both from a cooling angle and from a conditioning standpoint wherein precipitation of lead sulphate crystals creates a desirable condition within the battery. From the foregoing it will be apparent that we have discovered a method for fast charging batteries wherein the application of a few simple controls permits reduction in the period of time normally used to charge a battery control of the counter E. M. F., proper formation of the positive plate paste and likewise prevent overheating of the battery with the many deleterious effects resulting therefrom. In all cases, the temperature differential is the important factor during the specific charging procedure.

While the embodiment of the present invention as herein disclosed, constitutes a preferred form, it is to be understood that other forms might be adopted.

What is claimed is as follows:

1. In a method for the fast charging of batteries of the pasted lead plate type, the steps comprising; passing the highest charge current possible through the battery for a time sufficient to bring the charge within the battery to from one-third to two-thirds full charge while simultaneously limiting the temperature of the battery electrolyte to a maximum of not to exceed 120° F. above the ambient temperature, reducing the charge on the battery to a point sufficient to permit the battery electrolyte to cool to a least 40° F. above the ambient temperature and simultaneously to precipitate crystals of lead sulphate on the positive and negative plates, and then charging the battery at a rate further reduced until fully charged while simultaneously limiting the temperature of the electrolyte to a maximum of 90° F. above the ambient temperature, whereby the battery receives a full charge without excessive gassing and in a relatively short time.

2. In a method for the fast charging of batteries of the pasted lead plate type, the steps comprising; charging the battery until approximately a one-half charge is obtained at a rate sufficient to bring the temperature of the battery to a maximum of not over 120° F. above the ambient temperature, cooling the battery to approximately 40° F. above ambient temperature, and then again raising the temperature of the battery to approximately 90° F. above ambient temperature through an induced charge therein less than the initial charge until the battery is fully charged.

3. In a method for the fast charging of storage batteries of the pasted lead plate type wherein a 15-plate battery includes about 350 square inches of positive plate area, the steps comprising; charging the battery at about a 25 ampere rate for about six hours, resting the battery for approximately four hours, charging the battery at a reduced rate of about 20 amperes for seven hours and then further reducing the charge rate to about 10 amperes for about five hours whereupon the battery is fully charged and the positive plates are properly formed.

4. In a method for the fast charging of storage batteries of pasted lead plate type, the steps comprising; inducing a charge therein as high as possible while simultaneously maintaining the battery at not over 120° F. above ambient temperature maximum for a time sufficient to bring the battery to approximately one-half charge, reducing the initial charge sufficiently to cause the battery to cool to a temperature of not less than 40° F. above the ambient temperature, and then again charging the battery at a further reduced rate while maintaining a maximum temperature of 90° F. above ambient temperature until the battery is fully charged.

5. In a method for the fast charging of storage batteries of the pasted lead plate type, the steps of; limiting the temperature of the battery to a maximum of 120° F. above ambient temperature while inducing as high a charge as is possible into the battery through a period sufficient to cause the battery to become from one-third to two-thirds fully charged, precipitating lead sulphate crystals on the positive and negative lead plates by cooling the battery to a temperature of not less than 40° F. above ambient temperature by resting the battery, and then further charging the battery at a rate less than the initial rate used while maintaining a maximum temperature of not more than 90° F. above the ambient temperature during the final charge period for bringing the battery to full charge.

THOMAS L. KENDALL.
CLIFFORD B. BODENHAFER.
ROY I. PLUMMER.

References Cited in the file of this patent

UNITED STATES PATENTS

| Number | Name | Date |
|---|---|---|
| 1,126,669 | Wilson | Jan. 20, 1915 |
| 1,224,986 | Wilson | May 8, 1917 |
| 1,287,259 | Dixon | Dec. 10, 1918 |
| 1,457,863 | Strawmyer et al. | June 5, 1923 |
| 1,602,559 | Strawmyer | Oct. 12, 1926 |
| 1,743,593 | Broadfoot | Jan. 14, 1930 |
| 1,743,594 | Broadfoot | Jan. 14, 1930 |
| 1,786,280 | Woodbridge | Dec. 23, 1930 |
| 2,070,541 | Beetem | Feb. 9, 1937 |
| 2,227,118 | Amsden | Dec. 31, 1940 |
| 2,354,877 | Peters | Aug. 1, 1944 |